United States Patent Office 3,061,580
Patented Oct. 30, 1962

3,061,580
UNSATURATED POLYESTER RESINS CONTAINING A LITHIUM HALIDE AS STABILIZER AND METHOD OF MAKING
Warren O. Erickson, Fort Lauderdale, Fla., and William J. Connolly, Toledo, Ohio, assignors to Allied Chemical Corporation, New York, N.Y., a corporation of New York
No Drawing. Filed Oct. 22, 1959, Ser. No. 847,906
13 Claims. (Cl. 260—45.4)

This invention relates to resinous thermosettable polyester compositions that comprise copolymerizable mixtures of ethylenically unsaturated polyester resins and ethylenically unsaturated monomers. More particularly, the invention relates to the production of unsaturated polyester resin compositions that are exceptionally stable even at elevated temperatures and during long periods of storage prior to use, but which are nevertheless readily thermosettable subsequent to incorporation of catalyst into the mixtures.

The term "unsaturated polyester resin composition" is used herein in the general sense it now conveys in the art; namely, to refer generally to those compositions that comprise a polymerizable unsaturated polycarboxylic acid-polyhydric alcohol polyester, which is prepared by an esterification reaction between one or more polybasic acids, at least one of which is unsaturated, and one or more polyhydric alcohols. Such compositions preferably comprise also a copolymerizable monomeric substance that contains at least one $CH_2=C<$ group.

In general, unsaturated polyester resin compositions of the type referred to cure or harden rather slowly. This characteristic originally limited the utility of such resins insofar as commercial use was concerned. However, it has been conventional in the art for some time to add a catalyst, usually some type of peroxy compound, prior to use of the polyester composition, whereby the rate of thermosetting or cure is greatly increased. As a result, polyester resin compositions have found wide applicability in the molding, laminating, casting, coating, and other fields.

Unfortunately, these polyester compositions, being thermosettable, begin to cure or harden either immediately upon mixing of the polyester and monomer components or shortly after preparation, even prior to the incorporation of catalyst, and the rapidity of this occurrence is increased by higher ambient temperatures. Originally, this fact limited the use of these otherwise recognizedly valuable materials to applications where they could be finally cured comparatively shortly after preparation. For the purpose of obviating this serious limitation on the use of these compositions, it has also been conventional in the art for some time to incorporate in said compositions, certain substances known as gelation inhibitors or stabilizers, that prevent setting up of the compositions for appreciable lengths of time. Examples of polymerization inhibitors of commercial acceptability are hydroquinone, tertiary butyl-catechol, p-benzoquinone, 3-isopropyl catechol, 4-isopropyl catechol and others. These inhibitors are normally employed in amounts effective to prevent premature gelation of a given polyester composition to a desired degree. A problem is posed by their use, since the inhibitory function against premature gelation is carried over during the time of cure in the presence of a catalyst. This results in either increased cure time or increased cost of additional catalyst if added to overcome said inhibitory function. In the latter case, the additional catalyst may also cause difficultly controlled cures of the compositions.

There are several criteria for determining the comparative worth or relative effectiveness of a gelation inhibitor. A primary criterion, of course, is the ability of the inhibitor to prevent gelation of the polyester resin composition in which it is incorporated, for extended lengths of time under ordinary ambient temperature conditions. Another criterion is the ability of the inhibitor to function as such for shorter times under extraordinary temperature conditions prior to inclusion of peroxy catalyst. Finally, there is another criterion, most difficult of fulfillment, particularly in conjunction with the others, that is the ability of the inhibitor not to interfere to any appreciable extent with the functioning of a peroxy catalyst that is incorporated in the resin compositions prior to ultimate cure. In the optimum situation, the ideal inhibitor functions not merely passively in the presence of the added peroxy catalyst, but actively to accelerate the action of the catalyst. Such compounds per se have come to be known as "promoters."

There are similarly several criteria for determining the comparative worth or relative effectiveness of a compound as a promoter for a peroxy catalyst system in polyester resin compositions. For example, the criteria relied upon in the standard Society of the Plastics Industry (SPI) hardening tests are useful for such comparisons. The tests are commonly referred to in group as the SPI Gel Time Determination. Briefly, the tests involve determination of the time temperature characteristics of a particular resin sample solution containing a known amount of catalyst and a known amount of a particular promoter. More particularly, one of these criteria determined in the aforesaid test is "gel time" which is the time interval measured that it takes for the resin sample solution to pass from 150° F. to 190° F., wherein greater promotive power is reflected in shorter "gel time." Another criterion is "time of exotherm," which is the time interval measured from the time the sample attains a temperature of 150° F., until the highest or peak temperature is attained, the shortness of such time similarly indicating the degree of promotive power. Still another criterion is "peak exotherm," which is the actual highest temperature reached by the resin sample solution during cure. This last value, in addition to indicating the promotive power of a substance used for such purpose, indicates the likelihood that the resin will cure to an acceptable rigid state under room temperature conditions and within a reasonable time, the comparison, however, being taken under elevated temperature curing conditions.

In addition to the foregoing, the room temperature pot life of polyester resin solutions containing predetermined amounts of catalyst and promoter is also of importance in determining the efficacy of a catalyst-promoter system. Pot life is measured as the time that it takes, subsequent to incorporation of the promoter-catalyst system, for gelation to occur at room temperature, and gelation is said to occur when the resin solution is no longer flowable. As a practical matter, it is necessary that a polyester resin have a sufficiently long pot life so that, after it is catalyzed and promoted by the additions of a peroxy compound and accelerator, respectively, there still remains sufficient time to pour, spread or otherwise arrange the resin into the shape or form desired in the hardened, rigid state, before it becomes non-flowable. On the other hand, it is frequently highly desirable, particularly in room temperature curing applications, for the polyester resins to have a rather short pot life (e.g., 15 minutes) whereby gelation will occur very quickly after the aforesaid spreading or otherwise arranging operation, so as to eliminate flow-off, disarrangement, etc., which otherwise occurs and which usually requires time-consuming, continued spreading, reforming and rearranging until gelation does finally set in.

In certain applications, such as in the manufacture of button blanks, in the production of corrugated sheet, and the like, it may be desirable to have the resin, that contains the promoter-catalyst system, in a semi-cured gelled condition for several hours after initial gelling to permit cutting or stamping of the products prior to rapid cure to an infusible state by post-curing thereof at an elevated temperature.

While certain of the presently known inhibitors that function dually as promoters for polyester resins after addition of peroxy catalyst do achieve optimum results in one or more of the various criteria described above with respect to desirable inhibitive and promotive functions, they leave much to be desired in the matter of achieving desirable balances of values in all said criteria. The problem is complicated by the fact that, upon addition of many known inhibitors and/or promoters in polyester resins the substances per se tend to discolor the compositions.

Another known difficulty with the polyester compositions that contain a combined gelation inhibitor and promoter for peroxy-catalyst systems, is that while they may achieve varying degrees of fair or good results in the criteria discussed above, they may have the tendency to cause uncontrolled or run-away reactions due to the over-promotion of the peroxy catalyst. As a consequence, hot spots in localized areas of the curing mass may occur with resultant serious flaws in the finished products that are obtained therefrom.

In view of the foregoing, it is a primary object of the present invention to provide polyester resin compositions that have improved high temperature and storage stability when in uncatalyzed state.

It is another object of this invention to permit the introduction of monomers to polyester resin compositions even when the latter are at elevated temperatures, without incurring undesirable premature gelation.

It is another primary object of the invention to provide polyester resin compositions of the aforesaid stability when in uncatalyzed state, and which have excellent gelation and curing characteristics subsequent to incorporation therein of peroxy catalyst.

It is yet another object of the invention to provide such stabilized polyester resin compositions that do not have their color affected adversely, even after curing in the presence of catalyst.

It is yet another object of the invention to provide said stabilized polyester resin compositions that, when catalyzed, also provide optimum balances of various criteria for promotive effect; namely, gel time, time of exotherm, peak exotherm, pot life, and semi-cure life.

Another object of the invention is to provide a method of stabilizing unsaturated polyester resin compositions that assures the aforesaid advantages and, in addition, results in smooth and controlled polymerization reactions subsequent to addition of catalyst and application of curing conditions.

It is yet another object of the invention to provide novel compositions that include two-component inhibitor systems that give improved inhibitive results and that, subsequent to incorporation therein of a peroxy catalyst, at least assure rapid, smooth, even, and controlled polymerization and resultant minimization of flaws in the finally cured product, if they do not actually enhance such curing results.

Other objects, purposes and advantages of the invention will appear to those skilled in the art upon reading the description of the invention that follows.

In general, the invention resides in methods of effectively stabilizing unsaturated polyester resins derived from polyhydric alcohol and unsaturated polycarboxylic acid, which comprises incorporating therein, as stabilizer, a lithium halide. The invention also comprises the production of polymerizable unsaturated polyester resin compositions that comprise (a) an esterification product of polyhydric alcohol and unsaturated polycarboxylic acid, and (b) a lithium halide, which compositions are exceptionally stable if stored for long periods of time in uncatalyzed state and for shorter periods of time at higher temperatures, but which are particularly adapted to be cured under desired conditions, by the addition of the peroxy catalyst chosen, such as benzoyl peroxide. It has been found that the lithium halide compounds described herein function in a completely unexpected manner as highly effective promoters for catalyst systems that include a tertiary hydroperoxide; e.g., cumene hydroperoxide.

In a preferred embodiment of the invention, there is included the substance copper naphthenate, that has an unexpected synergistic effect on the stabilizing effect of the lithium halide, and, subsequent to addition of peroxy catalyst, on the promotive effect of the lithium halide, even when said copper naphthenate is added in minute quantities.

Preferably, in accordance with the invention, both in exercising the methods and in the production of the products, a compound containing at least one $CH_2\!\!=\!\!C<$ group and having a boiling point above 60° C., and copolymerizable with the unsaturated polyester resin, is included.

As polybasic component of the unsaturated polyester resin, there may be chosen an alpha-beta unsaturated dibasic organic acid, of which are preferred maleic, fumaric, glutaconic, itaconic, mesaconic, and citraconic. Maleic, itaconic or citraconic anhydrides may be used instead of the corresponding acids. Other isomers of the maleic series, typified by allyl-malonic, allyl-succinic, and xeronic acids may also be used in the production of the polyesters. Also employable are certain polybasic acids which decompose under heat to yield acids of the maleic type, such as malic and citric acids. Unsaturated dibasic organic acids admixed with other dibasic acids, such as phthalic, tetrachlorophthalic, hexachloroendomethylene tetrahydrophthalic (or their anhydrides), adipic, sebacic, etc., are similarly useful. The foregoing listing of acids with which polyesters may be prepared is to be understood as merely illustrative and not limitative, it merely being preferred that the polyester be an unsaturated polyester wherein at least 20 mol percent of the polycarboxylic acid is alpha-beta unsaturated polycarboxylic acid or anhydride.

Of the polyhydric alcohols which are known to be useful in the production of unsaturated polyester resins to which the present invention pertains, there may be chosen dihydric alcohols and mixtures thereof, or mixtures of dihydric alcohols and small amounts of higher polyhydric alcohols. The glycols, such as diethylene glycol, triethylene glycol, trimethylene glycol, monoethylene glycol, and propylene glycol and derivatives thereof, may also be used. Examples of higher polyhydric alcohols which may be employed in the production of the polyester contemplated, in amounts not exceeding about 5 mol percent, are glycerol, pentaerythritol, mannitol, etc. Also employable, as part or all of the dihydric alcohols to be used, are the more complex glycols of the bisphenol A type, such as those disclosed in U.S. Patent No. 2,331,265.

The unsaturated polyester resins for which the present invention has been found to be most useful are those that are manufactured from polyhydric alcohol and unsaturated polybasic acid by standard and well known polyesterification techniques, to have acid numbers not greater than 50, although resins having acid numbers as high as 100 may be used and may even be desirable in some cases. Generally, the acid number should be as as low as possible, and particularly good results are obtained when the polyester resin used has an acid number between 15 and 50.

A polymerizable unsaturated monomeric substance that may be included with the unsaturated polyester resins in conventional manner and in the practice of the present invention, may be any substance (or mixture of such substances) whose molecule contains at least one polymerizable ethylenic double bond that is capable of copolymerizing with the polymerizable unsaturated polycarboxylic acid-polyhydric alcohol polyester. Examples of such monomeric substances are now well known in the polyester art, and include, merely by way of example, styrene, p-methyl styrene, vinyl toluene, divinyl benzene, methyl acrylate, methyl methacrylate, acrolein, diallyl phthalate, triallyl cyanurate, the diallyl ester of endomethylene tetrahydrophthalic anhydride, etc.

The catalyst that may be introduced into polyester resin compositions containing a lithium halide (and optionally, copper naphthenate), when cure of said compositions is desired, may be any peroxy catalyst such as benzoyl peroxide, tertiary butyl hydroperoxide, cyclohexanol peroxide, ascaridol, etc., or mixtures thereof. In the event the benefits of the promotive action of the lithium halide present in the compositions of the invention are also desired, the peroxy catalyst system should comprise, at least in part, tertiary hydroperoxide catalyst that may be an aralkyl hydroperoxide having the following formula:

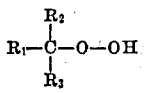

where $R_1$ is an aryl group, $R_2$ and $R_3$ are alkyl groups and any of $R_1$, $R_2$ or $R_3$ may contain substituents attached thereto, other than halogens or other atoms or groups which might adversely affect the character of the hydroperoxide linkage. Examples of such hydroperoxides are cumene hydroperoxide, cymene hydroperoxide, sec-butylbenzene hydroperoxide, 1-methyltetralin hydroperoxide, etc.

The compound to be used in conjunction with the polyester resin compositions to form the stabilized systems in accordance with the present invention is a lithium halide that is soluble in the polyester resin composition into which it is incorporated. The lithium halide may be incorporated in amounts ranging from about 0.0001% to about 0.5% by weight of the total polyester resin composition depending on the substance utilized, the kind and amount of catalyst to be incorporated, and the extent of promoter action desired.

For the purpose of greatly augmenting the gelation inhibiting action of the lithium halide upon the unsaturated polyester resin system comprising copolymerizable polyester and monomer, it has been found advantageous in many instances, in accordance with the invention, to add a second specific composition. Thus, it has been discovered that the inclusion of even a minute amount of copper naphthenate augments the inhibiting action of the lithium halide on polymerization of polyester resins to an unexpected degree, due to a totally unexpected synergistic action, and moreover, either does not affect the promotive function of the halide or, depending on the peroxy catalyst chosen, enhances the latter effect in a controlled manner, that avoids run-away reactions and localized hot spots in the curing mass. It has been found that this second compound, copper naphthenate, may be included in amounts from about 0.0001% to about 0.5% by weight of the total polyester composition to perform its functions. When appreciably less than the aforesaid minimum amount is included, no practical effect is observed, whereas when appreciably more than the maximum amount of second compound is employed, the stabilizing function of the lithium halide is not additionally affected to an extent that, from a practical standpoint, warrants any greater amount of copper naphthenate than said maximum. The inclusion of copper naphthenate as compound that functions as second inhibitor and, under certain circumstances, as second promoter, in addition to permitting controlled curing of the compositions subsequent to introduction of catalyst, whereby more uniform gel times are achieved with similar compositions; also decreases the observable gel time to a marked degree.

In the exercising of the invention, the unsaturated polyester chosen to be used is preferably mixed with a monomer, as referred to above; and a lithium halide. When desired, copper naphthenate as second inhibitor is also thoroughly mixed into the polyester-monomer mixture. This results in the highly desirable benefits of the invention, whereby the polymerizable compositions are rendered high temperature- and storage-stable.

Thereafter, which may be months later, and at a predetermined time before the ultimate use of the unsaturated polyester composition for curing, the peroxy compound chosen is incorporated as catalyst. The predetermined time is dependent upon the proportions of ingredients employed chosen for a particular application, since sufficient time is allowed by the use of the novel inhibitor-promoter system described herein, to permit placement of the polyester composition where it is intended to be cured.

The following typical formulations are given by way of example to illustrate the methods and compositions of this invention. All parts are given by weight.

EXAMPLE 1

An unsaturated polyester resin was prepared in conventional manner from components consisting of 0.17 mol phthalic anhydride, 0.38 mol maleic anhydride and 0.52 mol dipropylene glycol, by heating a mixture thereof. The heating was carried out under a $CO_2$ atmosphere at an elevated temperature for a period of time until the acid number had fallen to appreciably below 100, as is conventional in the art. Thereafter, styrene and hydroquinone were added to the polyester in amounts that were 26% and 0.013%, respectively, of the total composition. Three equal batches of the final polyester resin composition were then separated and designated as samples "A," "B" and "C."

Into said samples designated "A" and "B," amounts of lithium chloride were charged to the extent of 0.005% and 0.010% of the total weights of said samples, respectively. No lithium chloride was introduced into sample "C," that was intended to function as a control. Equal portions of each of said three uncatalyzed samples were then tested for stability at high temperatures by maintaining the sample portions at 120° C. and observing the time interval for gelation to occur. The remaining portions of each of the three samples "A," "B" and "C" were then catalyzed by introduction of an amount of benzoyl peroxide into each sample so that said catalyst was present in each sample in amount that equalled 1.0% of each, respectively.

Thereafter, equal parts of the catalyzed samples "A," "B" and "C," respectively were placed in an oil bath at 180° F., and the "SPI Gel Time," the "Peak Exotherm Temperature" and the "Time to Peak Exotherm" were observed (i.e., the time it takes for the temperature of the sample to rise from 150° F. to 190° F., the highest temperature attained by the sample, and the time interval for the last temperature to be reached, respectively, as referred to hereinbefore). The results of the foregoing observations are given in Table I, below:

Table I

| Sample | Stability at 120° C. (Minutes) | Gel Time | Peak Exotherm, ° F. | Time to Peak Exotherm |
|---|---|---|---|---|
| C (Control) | 20–30 | 5 Min. | 406 | 6 min., 24 sec. |
| A | 130–190 | 5 Min., 22 sec. | 395 | 7 min. |
| B | 240–260 | 5 Min., 22 sec. | 402 | 7 min. |

EXAMPLE 2

Another unsaturated polyester resin was prepared in conventional manner from components consisting of 0.29 mol maleic anhydride, 0.22 mol isophthalic acid, and 0.50 mol diethylene glycol, by heating a mixture thereof. The heating was carried out conventionally under an inert atmosphere at an elevated temperature for a period of time until the acid number of this polyester had fallen appreciably below 100. Thereafter, styrene and hydroquinone were added to the polyester in amounts that were 30% and 0.004% of the total composition. As in Example 1, three equal batches of the polyester were separated and then designated, in this case, as samples "D," "E" and "F."

Into samples "D" and "E," amounts of lithium chloride were charged to the extent of 0.001% and 0.005% of the total weights of said samples, respectively. As in Example 1, no lithium chloride was introduced into the third sample "F," that was intended to function as a control. Equal portions of the three uncatalyzed samples "D," "E" and "F" were tested for high temperature stability and for slightly elevated temperature stability by observing the time intervals necessary for separate samples to gel when maintained at a temperature of 120° C. and at a temperature of 120° F., respectively. Other portions of the three samples "D," "E" and "F" were catalyzed by introduction of benzoyl peroxide so that the amount in each sample equalled 1.0% of each, respectively.

Equal portions of the catalyzed samples "D," "E" and "F," respectively, were then placed in an oil bath at 180° F. and the "SPI Gel Time," "Peak Exotherm," and "Time to Peak Exotherm" were observed as in Example 1. The room temperature pot life of each of these samples was also observed. Such observation is done simply by introducing 80 grams of each of the three resin samples into 150 ml. beakers and allowing them to set at room temperature. The samples are checked frequently and the pot life of each measured as the time that it takes for gelation to occur. The results of all of the foregoing observations are given in Table II, below:

*Table II*

|  | Sample F (Control) | Sample D | Sample E |
|---|---|---|---|
| Stability at 120° C. (Minutes) | 20–40 | 70+ | 120–190. |
| Stability at 120° F. (Days) | 6 | 40 | 47. |
| Gel Time | 3 min., 24 sec. | 3 min., 37 sec. | 4 min., 7 sec. |
| Peak Exotherm | 406° F. | 432° F. | 409° F. |
| Time to Peak Exotherm | 4 min., 52 sec. | 4 min., 35 sec. | 5 min., 30 sec. |
| Pot Life (Days) | 2–3 | 2–3 | Less than 1. |

It was also observed that when lithium chloride is added at an elevated temperature of 110° F. to the uncut base resins such as those described in Examples 1 and 2, it furnishes excellent stability by avoiding gelation during the addition of monomer, in addition to giving extended room temperature shelf life.

EXAMPLE 3

A polyester was prepared from components comprising 0.25 mol phthalic anhydride, 0.25 mol maleic anhydride, and 0.52 mol propylene glycol, by conventionally heat-reacting the same under an atmosphere of $CO_2$ for an extended period of time until the acid number was appreciably below 100. Styrene and hydroquinone were admixed with the resulting polyester in proportions that the monomer and inhibitor comprised 34.5% and 0.003%, respectively, of the total composition.

In a batch of the above-described polyester-monomer resin composition, there was charged lithium chloride to the extent of 0.01% of the total weight of said batch. Two equal portions of the batch were designated "G" and "H," and in sample "G," there was included copper naphthenate in amount that was 0.0006% of the total weight of the sample. Portions of both of the samples "G" and "H" were subjected to the 120° C. stability test, and other equal portions of said samples were catalyzed by introduction of benzoyl peroxide therein to the extent of 1% of the total sample, and the "SPI Gel Time," "Peak Exotherm Temperature," and "Time to Peak Exotherm," were observed as in the previous examples. The results of the foregoing observations are given in Table III, below:

*Table III*

| Polyester Resin | Sample | Stability at 120° C. (Minutes) | SPI Gel Time (Minutes) | Peak Exotherm, ° F. | Time to Peak Exotherm, minutes |
|---|---|---|---|---|---|
| ctg. .010% LiCl | H | 45 | 5½ | 392 | 7.1 |
| ctg. 0.10% LiCl + 0.0006% Cu Naphth. | G | 75 | 5½ | 392 | 7.1 |

It was found that the copper naphthenate in sample "G," that obviously increased the uncatalyzed shelf life of the polyester resin in which it was incorporated in conjunction with a lithium halide, had no undesirable effect on the curing characteristics of the compositions after introduction of catalyst nor on the color of the cured products resulting therefrom.

It is to be understood that the constituents of the polyester compositions in the foregoing examples have been selected as representative of the materials normally found in such compositions, and that the advantages obtained by the invention are unaffected by conventional substitutions or omissions. For instance, similar results are obtained if the styrene is replaced in whole or part by methyl methacrylate or other known cross-linking monomer. Incorporation of glass fibers in the resin compositions, and/or other fibers, such as asbestos fibers and the like, may be accomplished before or after the inclusion of peroxy catalyst if the compositions are to be used in molding applications, for extrusions, or in laminating operations, for example. Similarly, other filler materials may be included, additional stabilizer may be omitted, and/or other conventional stabilizers, pigments and other additions may be added or substituted for those disclosed.

Furthermore, the relative proportions of the constituents listed in the examples or the substitutes therefor listed in the foregoing paragraph, as well as hereinbefore, and/or known in the polyester resin art, may be varied within very wide limits. Thus the unsaturated polyester resin constituents can be varied, and the proportion of monomer-polyester resin in the unsaturated polyester combination may likewise vary between very wide limits. Moreover, the proportions of stabilizers, promoters, and catalysts can be varied to give the desired combination of shelf life and high temperature stability when in uncatalyzed condition; and pot life, as well as gel time, semi-cure life, and cure time characteristics, when in catalyzed condition.

We claim:

1. A method of stabilizing a resinous copolymerizable mixture against premature gelation that comprises: admixing (1) unsaturated polyester resin derived from polyhydric alcohol that comprises at least 95 mol percent dihydric alcohol and polycarboxylic acid that comprises at least 20 mol percent alpha-beta unsaturated dicarboxylic acid, and having an acid number no higher than 100, (2) a copolymerizable compound containing at least one $CH_2=C<$ group and having a boiling point above 60° C., and (3) a small stabilizing amount of a lithium halide.

2. A method of stabilizing unsaturated polyester resins as claimed in claim 1, wherein said lithium halide is lithium chloride.

3. A method of stabilizing a resinous copolymerizable mixture as claimed in claim 1, wherein there is also admixed a small amount of copper naphthenate.

4. A method of stabilizing against premature gelation a composition comprising an unsaturated polyester resin derived from polyhydric alcohol that comprises at least 95 mol percent dihydric alcohol and polycarboxylic acid that comprises at least 20 mol percent alpha-beta unsaturated dicarboxylic acid, and having an acid number no higher than 100 which comprises: incorporating in said composition, as stabilizer, a lithium halide, and thereafter admixing the composition with a copolymerizable monomeric compound containing at least one $CH_2=C<$ group and having a boiling point above 60° C.

5. A method of stabilizing a composition comprising an unsaturated polyester resin as claimed in claim 4, wherein said composition into which said lithium halide has been incorporated, is at an elevated temperature when said copolymerizable monomeric compound is admixed therewith.

6. A polymerizable unsaturated polyester resin composition comprising: (A) an esterification reaction product of (1) polyhydric alcohol that comprises at least 95 mol percent dihydric alcohol and (2) polycarboxylic acid that comprises, in an amount that is at least 20 mol percent thereof, an alpha-beta unsaturated dicarboxylic acid, said product having an acid number no higher than 100, and (B) a small amount of a lithium halide.

7. A polymerizable unsaturated polyester resin composition as claimed in claim 6 that also comprises a small amount of copper naphthenate.

8. A polymerizable unsaturated polyester resin composition comprising: (A) an esterification reaction product of (1) polyhydric alcohol that comprises at least 95 mol percent dihydric alcohol and (2) polycarboxylic acid that comprises, in an amount that is at least 20 mol percent thereof, an alpha-beta unsaturated dicarboxylic acid, said product having an acid number no higher than 100, (B) a copolymerizable substance having at least one $CH_2=C<$ group and having a boiling point of at least 60° C., and (C) a small amount of a lithium halide.

9. A polymerizable unsaturated polyester resin composition comprising: (A) an esterification reaction product of (1) polyhydric alcohol that comprises at least 95 mol percent dihydric alcohol and (2) polycarboxylic acid that comprises, in an amount that is at least 20 mol percent thereof, an alpha-beta unsaturated dicarboxylic acid, said product having an acid number no higher than 100, (B) a copolymerizable substance having at least one $CH_2=C<$ group and having a boiling point of at least 60° C., (C) a small amount of a lithium halide, and (D) a small amount of copper naphthenate.

10. A polymerizable unsaturated polyester resin composition comprising: (A) an esterification reaction product of (1) polyhydric alcohol that comprises at least 95 mol percent dihydric alcohol and (2) polycarboxylic acid, that comprises, in amount that is at least 20 mol percent thereof, alpha-beta unsaturated dicarboxylic acid, said product having an acid number no higher than 100, (B) a copolymerizable substance having at least one $CH_2=C<$ group and a boiling point of at least 60° C., and (C) about 0.0001% to 0.5% by weight of a lithium halide.

11. A polymerizable unsaturated polyester resin as claimed in claim 10, wherein said lithium halide is lithium chloride.

12. A polymerizable unsaturated polyester resin composition comprising: (A) an esterification reaction product of (1) polyhydric alcohol that comprises at least 95 mol percent dihydric alcohol and (2) polycarboxylic acid that comprises, in amount that is at least 20 mol percent thereof, alpha-beta unsaturated dicarboxylic acid, said reaction product having an acid number no higher than 100, (B) a copolymerizable substance having at least one $CH_2=C<$ group and a boiling point of at least 60° C., (C) about 0.0001% to 0.5% by weight of a lithium halide, and (D) about 0.0001% to 0.05% by weight of copper naphthenate.

13. A polymerizable product as claimed in claim 12, wherein said lithium halide is lithium chloride.

References Cited in the file of this patent

UNITED STATES PATENTS

| | | |
|---|---|---|
| 2,610,168 | Anderson | Sept. 9, 1952 |
| 2,851,430 | Niles | Sept. 9, 1958 |
| 2,878,214 | Holmes et al. | Mar. 17, 1959 |